(12) United States Patent
Nielsen

(10) Patent No.: US 6,679,750 B1
(45) Date of Patent: Jan. 20, 2004

(54) TOY BUILDING SET COMPRISING A VEHICLE

(75) Inventor: Helle Kleist Nielsen, Frederiksberg (DK)

(73) Assignee: Interlego AG, Baar (CH)

( * ) Notice: Subject to any disclaimer, the term of this patent is extended or adjusted under 35 U.S.C. 154(b) by 0 days.

(21) Appl. No.: 10/129,413
(22) PCT Filed: Nov. 3, 2000
(86) PCT No.: PCT/DK00/00613
§ 371 (c)(1), (2), (4) Date: Sep. 3, 2002
(87) PCT Pub. No.: WO01/32285
PCT Pub. Date: May 10, 2001

(30) Foreign Application Priority Data

Nov. 5, 1999 (DK) .......................... 1999 01598

(51) Int. Cl.$^7$ .............................................. A63H 33/04
(52) U.S. Cl. .......................... 446/85; 446/95; 446/278; 446/437
(58) Field of Search .............................. 446/85, 88, 93, 446/95, 96, 128, 437, 448, 465, 469, 471, 278

(56) References Cited

U.S. PATENT DOCUMENTS

| | | | |
|---|---|---|---|
| 2,424,607 A | * | 7/1947 | Fisher |
| 2,738,617 A | * | 3/1956 | Capehart |
| 3,713,247 A | * | 1/1973 | Parrilla |
| 3,782,751 A | * | 1/1974 | Williams |
| 3,835,583 A | | 9/1974 | Manning |
| 3,996,692 A | | 12/1976 | Daenen |
| 4,204,360 A | * | 5/1980 | Bentall |
| 4,329,809 A | | 5/1982 | Reece |
| 4,375,139 A | * | 3/1983 | Chatani |
| 4,446,649 A | * | 5/1984 | Moe et al. |
| D346,629 S | * | 5/1994 | Ruszkai .................... D21/108 |
| 5,707,271 A | * | 1/1998 | Kunz et al. ................. 446/437 |
| 5,813,894 A | * | 9/1998 | Tohyama ...................... 446/95 |
| 5,848,927 A | * | 12/1998 | Frederiksen ................ 446/128 |
| 6,176,759 B1 | * | 1/2001 | Trageser .................... 446/272 |

FOREIGN PATENT DOCUMENTS

| | | |
|---|---|---|
| DE | 19524038 | 1/1997 |
| GB | 2249735 | 5/1992 |
| SE | 116549 | 6/1946 |

* cited by examiner

Primary Examiner—Derris H. Banks
Assistant Examiner—Ali Abdelwahed
(74) Attorney, Agent, or Firm—Pitney, Hardin, Kipp & Szuch LLP

(57) ABSTRACT

A toy building set comprising at least one toy building element with a body part provided with coupling for interconnecting with other toy building elements, and a vehicle with a body that is provided with coupling for interconnecting with other toy building elements. The vehicle is provided with at least one wheel that is journalled on a shaft and that extends downwards from the vehicle body for abutment on a drive face. The wheel or wheels have a rolling face with varying distances from the shaft on which it is journalled such that a waving movement of the vehicle is obtained when it travels across a plane drive face.

6 Claims, 1 Drawing Sheet

TOY BUILDING SET COMPRISING A VEHICLE

The invention relates to a toy building set comprising at least one toy building element with a body part provided with coupling means for interconnecting with other toy building elements, and a vehicle with a body that is provided with coupling means for interconnecting with other toy building elements, said vehicle being provided with at least one wheel that is journalled on a shaft and that extends downwards from the vehicle body for abutment on a drive face.

Today there are many toy building sets of this type on the market that comprise toy building elements and vehicles that can be interconnected to form various structures. The vehicles are configured either as actual vehicles—cars, trucks, trains, etc.—or merely as a carriage bottom with wheels; in all cases they are provided with coupling means for interconnecting with other toy building elements. Typically the coupling means consist of coupling studs on the top faces of the toy building element as well as on the vehicles, and coupling means that are complementary therewith on the underside of the toy building elements and optionally of the vehicles.

In the prior art toy building sets of this type the vehicles are provided with circular wheels that are each concentrically journalled on a shaft such that, to a very wide extent, the vehicles resemble "authentic" vehicles.

U.S. Pat. No. 3,835,583 discloses a toy element that simulates a caterpillar or a worm. The toy building element is split and each of the two parts is provided with circular wheels. In the junction between the two parts a thoroughgoing shaft is provided on which two elliptical wheels are excentrically journalled. When the toy element travels across a plane drive face, the elliptical wheels will cause the junction to move up and down and it thus seems as if the toy element wiggles its way across the drive face.

GB-A-2 249 735 teaches a toy car wherein the front wheels are mounted on an excentrically journalled shaft. Therefore the toy car exhibits a tilting movement when it travels across a drive face.

It is the object of the present invention to provide a toy building set comprising a vehicle that exhibits particular driving features and that will, in combination with the remaining toy building elements in the toy building set, provide the user with completely novel and educating play experiences.

This is obtained by configuring the toy building set described above such that at least the one wheel has a rolling face with varying distances from the shaft on which it is journalled such that a waving movement of the vehicle is obtained when it travels across a plane drive face.

Hereby it is obtained that, apart from the option of constructing different structures by means of the remaining toy building elements on the vehicle, the vehicle also exhibits a tilting drive movement wherein the stability of the vehicle depends on the structure or construction made on the vehicle. It is thus possible to build a low structure by which the point of gravity of the entire vehicle is not raised or just raised slightly, such that it does not substantially influence the behavior of the vehicle. If, on the contrary, a high or heavy structure is built, the point of gravity is raised with ensuing considerable influence on the behavior of the vehicle.

With a toy building set according to the invention, the user is thus able to test the influence of differently constructed structures on the behavior of the vehicle; e.g., how high a structure can be built before the vehicle topples. Thus the toy building set according to the invention enables the user to have novel and educating play experiences.

According to a preferred embodiment the vehicle is provided with two wheels with varying distances from the shaft on which they are journalled to their respective roller faces, and the vehicle leans on the drive face with two of its wheels and with a support knob provided downwardly protruding from the vehicle body at a distance from the two wheels. Despite its simplicity—this construction yields a particularly interesting movement of the vehicle when it drives across a drive face.

Preferably, the wheels have a circular rolling face while simultaneously they are excentrically journalled on their respective axes. This is the most simple configuration of the wheels and additionally it imparts a very harmonious and regular movement pattern to the vehicle when it drives across a drive face.

Preferably, the coupling means of the toy building set consists of coupling studs that protrude from the body parts of the toy building elements and the vehicle body, respectively, and coupling means that are complementary therewith provided to be upwardly protruding at least in the body part of the toy building elements. Hereby it is possible to make the toy building set according to the invention complementary with existing toy building sets.

If a loose fitting is used between the coupling studs and the coupling means that are complementary therewith, it is possible to obtain very special effects when a vehicle provided with other toy building elements tiltingly travels across a drive face. As it is, the stacked toy building elements will constitute an instable construction that present the option of performing detours due to the movements of the vehicle. In order to further enhance the play experience, a drive means can be arranged within the vehicle body for advancing the vehicle, said drive means being in communication with a shaft on which a wheel is mounted. According to a particularly preferred embodiment the drive means is configured with a winding-up mechanism.

The invention will now be explained in further detail with reference to the drawing, wherein FIG. 1 shows a vehicle for a toy building set according to the invention in a preferred embodiment thereof;

Figure 1:
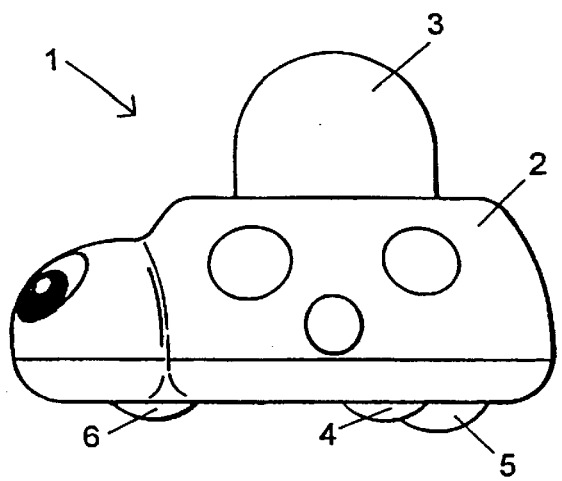

FIG. 1 shows a preferred embodiment of vehicle 1 for a toy building set according to the invention. In the embodiment shown the vehicle 1 simulates a ladybug or some other insect or animal. The vehicle has a body 2 that is provided with a coupling means in the form of an upwardly protruding coupling stud 3. Besides, the vehicle 1 is provided with two wheels 4 and 5 that extend from the bottom of the body 2, and with a support knob 6 that is rounded and an integral part of the body 2. When the vehicle 1 is positioned on a support or a drive face it leans on the wheels 4, 5 and the support knob 6.

In the embodiment shown the wheels 4, 5 are configured as circular discs, i.e., they have a circular roller face, but are journalled excentrically on a shaft in the vehicle 1. This appears most clearly from FIG. 2 that shows a drive unit 7 arranged within the vehicle shown in FIG. 1, whereas the body 2 of the vehicle 1 is shown by dotted lines.

The drive unit 7 is preferably a so-called 'pull-back' drive unit, i.e., a drive unit with a winding-up mechanism that can be activated by pulling the vehicle 1 rearward across a drive face, while the wheels 4, 5 are in contact therewith. When the vehicle 1 is subsequently let go, the drive unit 7 will make the wheels 4, 5 drive and cause the vehicle 1 to drive forward.

Figure 2:
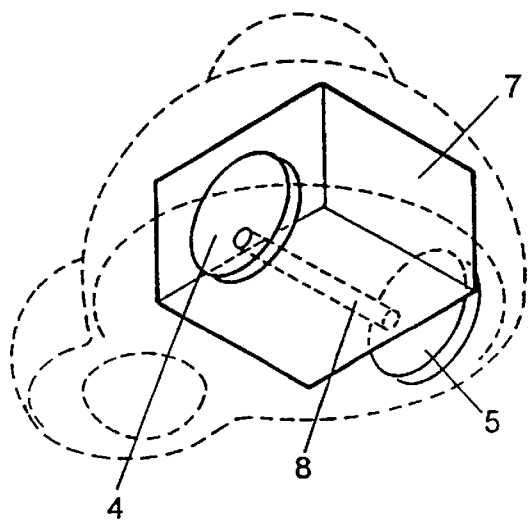
FIG. 2 shows a drive means arranged within the vehicle shown in FIG. 1.

As will appear most clearly from FIG. 2, the wheels 4,5 are excentrically journalled on a shaft 8 that is, in a manner not shown in further detail, connected to the drive unit 7. The wheels 4,5 are journalled asymmetrically such that when the wheel 4 is in its lowermost position the wheel 5 is in its uppermost position as shown.

Such journalling of the wheels 4,5 causes the vehicle 1 to tilt about a horizontal axis in the driving direction of the vehicle 1 when it drives on a plane drive face.

When the vehicle 1 is situated on a plane drive face it will, as mentioned, lean on the one hand on the wheels 4, 5 and on the other hand on the support knob 6. Such three-point support means that not only will allow the vehicle to tilt about a horizontal axis in it driving direction, but also to a smaller extent about a vertical axis that extends between the wheels 4, 5.

The overall movement of the vehicle 1 is thus a combination of a waving or tilting movement about a horizontal as well as a vertical axis with a resulting movement pattern that resembles a slalom course.

Figure 3:
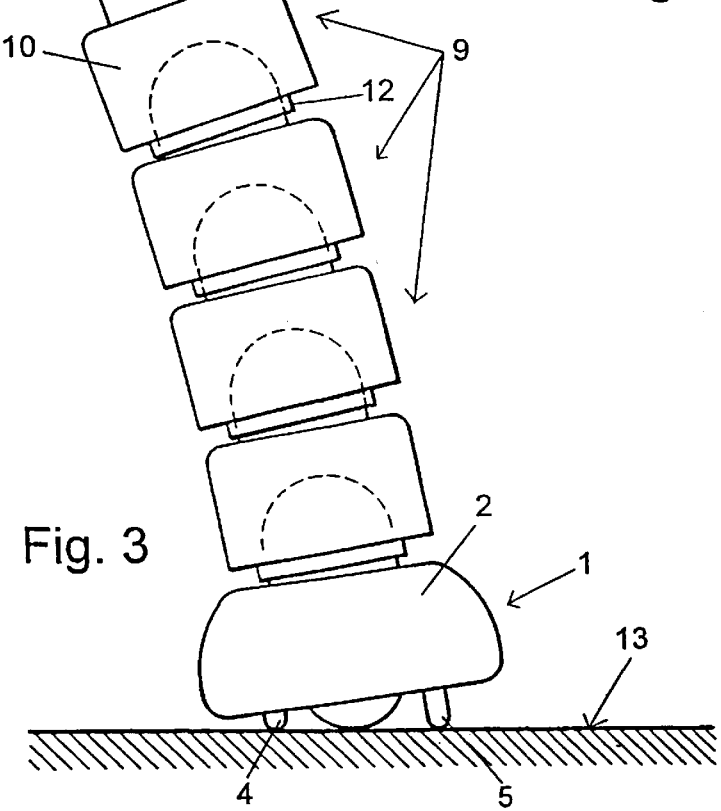
FIG. 3 shows toy building elements and a vehicle for a toy building set according to the invention in combined state.

Once again, FIG. 3 shows the vehicle 1 seen from behind wit three identical toy building elements 9 built on top. Each of the toy building elements 9 comprises a body part 10, a coupling stud 11 that protrudes upwardly from the body part 10, and a downwardly oriented skirt 12 in the form of a tubular member that can receive a coupling stud 3, 11.

In the embodiment shown the toy building elements 9 are configured as stacking elements, i.e., toy building elements where there does not exist a tight coupling between the various elements. Thus, the toy building elements 9 are able to capsize slightly relative to each other and relative to the vehicle 1 when they are interconnected. This is illustrated in FIG. 3 where the vehicle 1 is shown in a position where the wheel is located as far as possible into the body 2, whereas the wheel 5 is as far as possible out of the body 2. Since the vehicle 1 is arranged on a plane drive face 13, the vehicle 1 and the structure built thereon will incline to the left.

When the vehicle 1 drives forward the wheel 4 will come further out of the body 2, whereas the wheel 5 will disappear further into the body 2. Thus, the vehicle 1 will tilt toward the right and the built-on structure will follow. When the vehicle 1 drives across the drive face 13 the vehicle 1 along with the toy building elements 9 will tilt from side to side as indicated by the double arrow P. Since, however, the toy building elements 9 in the embodiment shown are configured as stacking elements without a tight coupling the built-up structure will be rather unstable and it will therefore move in an unpredictable manner. This contributes to increasing the play experience while simultaneously it is an educating experience to the user to observe the movements that occur.

If the toy building elements are configured with a tight coupling between their respective coupling means, stable structures can be constructed on the vehicle. Such structures shift the point of gravity of the vehicle in a predictable manner, and it is thus possible to experiment with differently constructed structures to see the influence of various locations of the point of gravity of the vehicle on the movements of the vehicle.

In the embodiment shown the wheels 4 and 5 are positioned asymmetrically on the same shaft 8 such that the vehicle 1 tilts from side to side when it drives across a drive face. However, the wheels could also be positioned symmetrically on the shaft whereby a tilting movement about a horizontal axis that extends transversally to the vehicle could be obtained, i.e., a back-and-forwardly tilting movement. Of course, the wheels can be journalled in other ways to obtain a different tilting movement.

The wheels could also be configured to be non-circular, e.g., elliptical or polygonal with rounded corners. In case of such configurations of the wheels the journaling need not be excentrical to still obtain the tilting or waving movement when the vehicle drives across a driving face.

Finally the vehicle can be configured without a drive unit, or it can be configured with some other kind of drive unit than the one shown, e.g., a battery-operated motor.

Other variations can be performed without therefore deviating from the idea of the invention.

What is claimed is:

1. A toy building set comprising:
   at least one toy building element (9) with a body part (10) provided with coupling means for interconnecting with other toy building elements (9), and
   a vehicle (1) with a body (2) that is provided with coupling means for interconnecting with other toy building elements (9), said vehicle (1) being provided with at least one wheel (4, 5) that is journalled on a shaft (8) and that extends downwards from the body (2) for abutment on a drive face (13),
   wherein the at least one wheel (4, 5) has a rolling face with varying distances from the shaft (8) on which it is journalled such that a waving movement of the vehicle (1) is obtained when it travels across a plan drive face (13); and
   wherein the vehicle (1) is provided with two wheels (4, 5) with varying distances from the shaft (8) on which they are journalled to their respective rolling faces; and wherein the vehicle (1) supports on the drive face (13) with the two wheels (4, 5) and a support knob (6) provided downwardly protruding from the body (2) of the vehicle at a distance from the two wheels (4, 5).

2. A toy building set according to claim 1, wherein each of the wheels (4, 5) has a circular rolling face, and that each wheel (4, 5) is journalled eccentrically on the shaft (8).

3. A toy building set according to claim 1 wherein the coupling means consist of coupling studs (3, 11) that protrude from the body part (10) of the toy building element and the body (2) of the vehicle, respectively, and coupling means that are complementary therewith provided to be upwardly protruding at least in the body part (10) of the toy building element.

4. A toy building set according to claim 3, wherein a loose fitting is provided between the coupling studs (3, 11) and the coupling means that are complementary therewith.

5. A toy building set according to claim 1, wherein a drive unit (7) for advancement of the vehicle (1) is provided within the body (2) of the vehicle, said drive unit (7) being in connection with a shaft (8) on which a wheel (4, 5 is mounted).

6. A toy building set according to claim 5, wherein the drive unit (7) is configured with a winding-up mechanism.

* * * * *